No. 617,949. Patented Jan. 17, 1899.
C. E. BLUE.
MACHINE FOR MANUFACTURING GLASSWARE.
(Application filed May 4, 1898.)
(No Model.) 3 Sheets—Sheet 1.
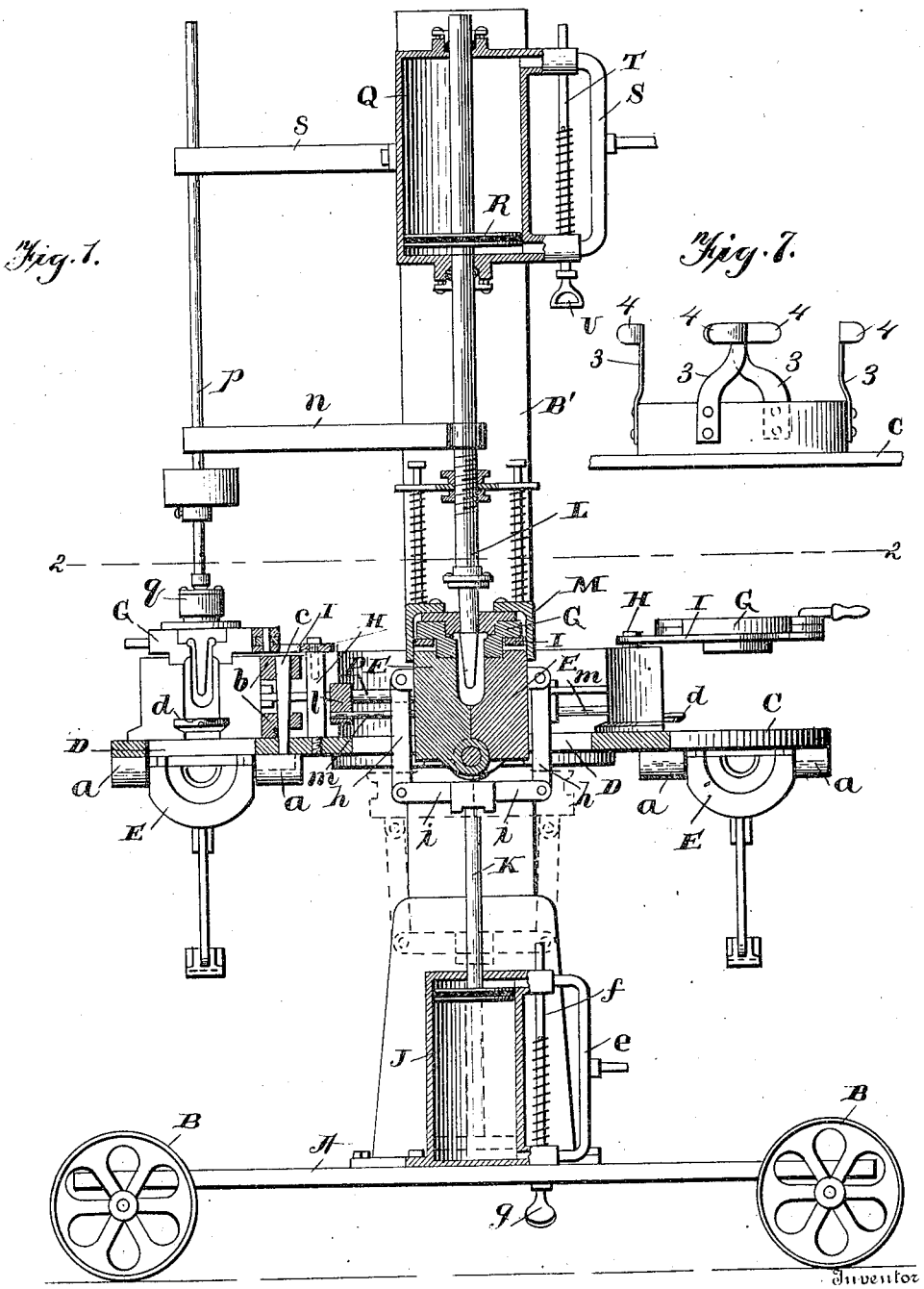
Witnesses
Geo. E. Frech.
O. E. Seitz
Inventor
C. E. Blue,
by A. F. Pattison
Attorney No. 617,949. Patented Jan. 17, 1899.
C. E. BLUE.
MACHINE FOR MANUFACTURING GLASSWARE.
(Application filed May 4, 1898.)
(No Model.) 3 Sheets—Sheet 2.
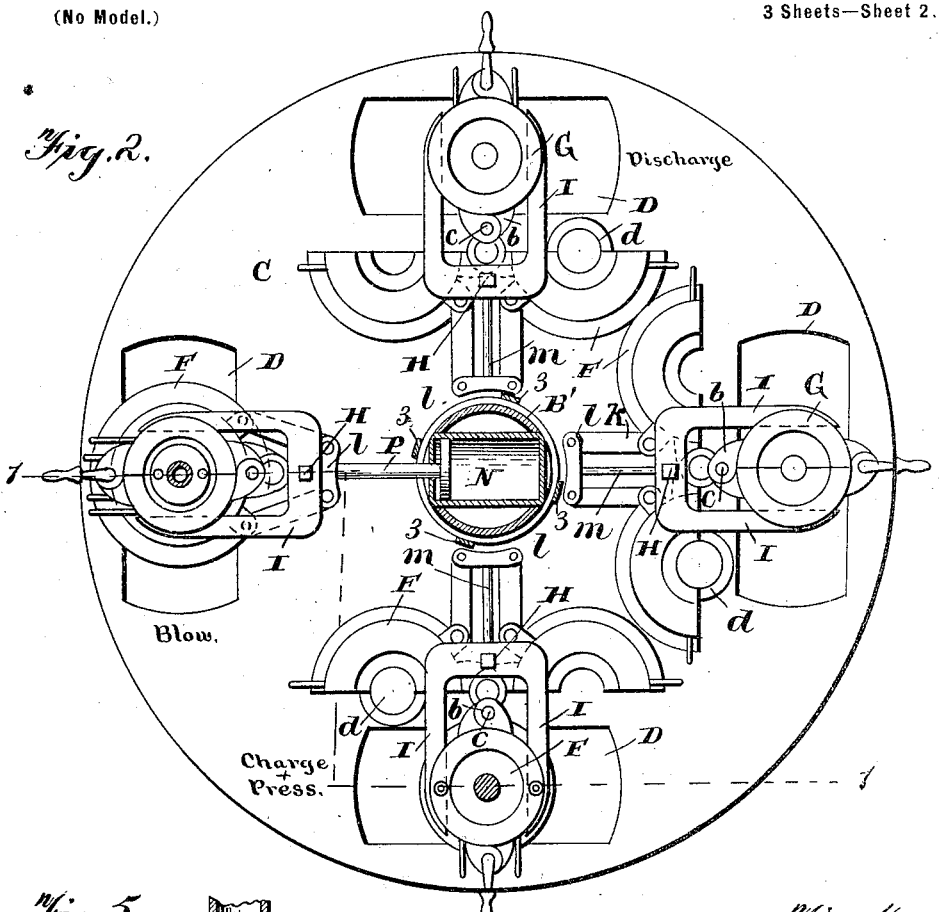
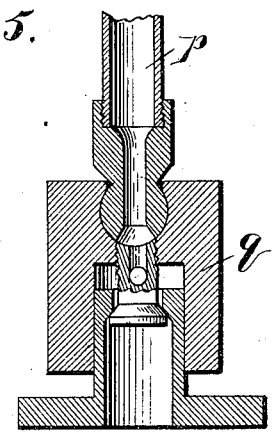
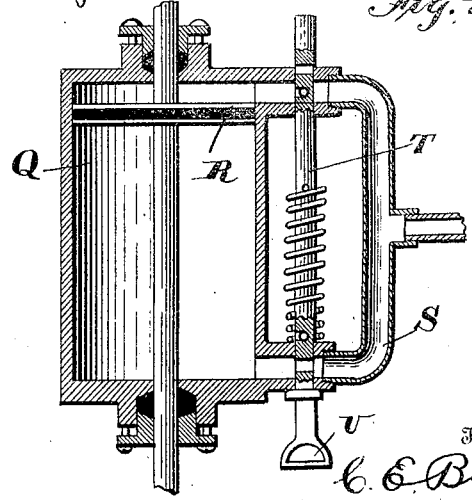

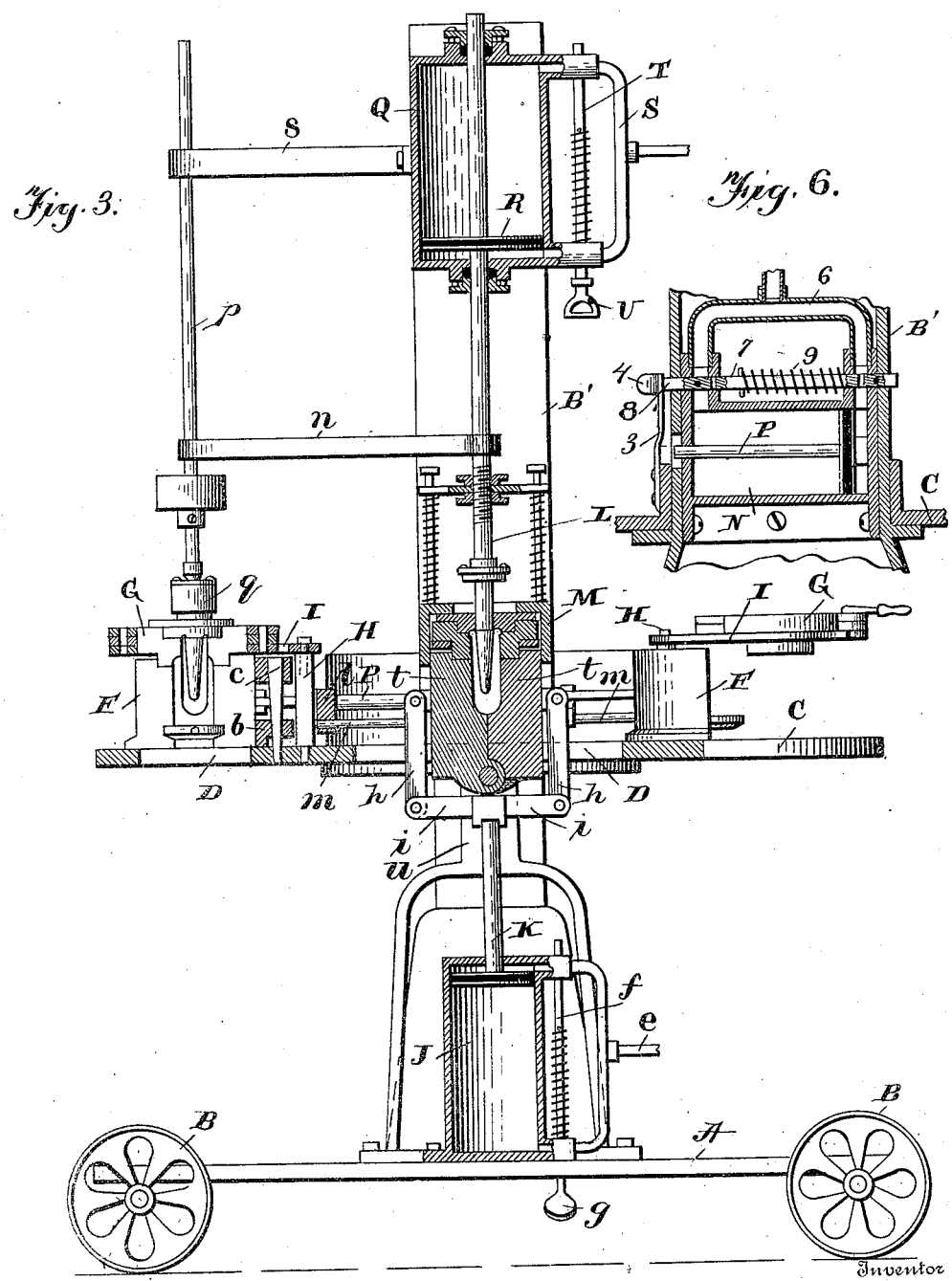

UNITED STATES PATENT OFFICE.

CHARLES EDWIN BLUE, OF WHEELING, WEST VIRGINIA.

MACHINE FOR MANUFACTURING GLASSWARE.

SPECIFICATION forming part of Letters Patent No. 617,949, dated January 17, 1899.

Application filed May 4, 1898. Serial No. 679,715. (No model.)

*To all whom it may concern:*

Be it known that I, CHARLES EDWIN BLUE, a citizen of the United States, residing at Wheeling, in the county of Ohio and State of West Virginia, have invented new and useful Improvements in Machines for the Manufacture of Glassware, of which the following is a specification.

My invention relates to improvements in machines for the manufacture of glassware, and pertains to that type of machines in which a blank is pressed and then finally blown to its finished form.

One object of my present invention is to provide a machine having a vertically-moving press mold or molds and a horizontally-moving blank, embracing blow mold or molds, whereby the press mold or molds move downward away from the pressed blank and the blow mold or molds pass thereover and horizontally close around the suspended blank, which is blown therein to its finished form.

Another object of my present invention is to provide a machine having a carrier which carries complete press and blow molds independent of each other and adapted to close over a common point, the press-mold to move vertically away from a pressed blank and the blow-mold to horizontally embrace the suspended pressed blank, in which it is blown to its final and completed form.

Another object of my present invention is to provide a rotatable or endless carrier carrying independent press and blow molds adapted to close over a common point, the press-mold adapted to swing downward below the carrier out of the way of the blow-mold and the blow-mold to swing horizontally for closing over the point occupied by the press-mold.

My invention consists in the construction and arrangement of parts, as illustrated in the accompanying drawings, of which—

Figure 1 is a vertical section taken on the dotted line 1 1 of Fig. 2. Fig. 2 is a horizontal sectional plan taken on the dotted line 2 2 of Fig. 1. Fig. 3 is a vertical sectional view similar to Fig. 1, showing a modification in which a single press-mold, supported upon a standard, is provided in lieu of a series of press-molds carried by the table. Fig. 4 is an enlarged sectional view showing the valve arrangement and the cylinder and piston for operating the plunger. Fig. 5 is an enlarged detail sectional view of the automatically-acting blow-head. Fig. 6 is an enlarged vertical sectional view taken through the base of the column B', showing the interior construction of the pressure-actuated piston, the cylinder, and valve for regulating the flow of air thereto. Fig. 7 is a detached view of the hub of the table with the cam attached thereto for actuating the cylinder-valve.

Referring now to the drawings, A indicates a base preferably mounted upon wheels B, which enables the machine to be easily transported and moved around to any desired point in the factory. Projecting from the center of this base A is a column B', around which a table C rotates and upon which the table is journaled and supported in any suitable manner. The table C is provided with a plurality of elongated openings D, and journaled to the under side of the table beneath these openings and in the lugs $a$ are the two parts E, which form the press mold or molds. This table also carries a corresponding number of blow-molds F, which consist of two vertical portions, as illustrated, and these two parts of the mold are provided at preferably their inner sides with the ears $b$, pivotally supported upon the pivotal rod $c$, extending from the table at the inner side of the openings D and intermediate their ends. These blow-molds are therefore adapted to be opened and closed horizontally for embracing and releasing the pressed blank in a manner to be particularly described hereinafter. One of the parts F of the blow-mold carries the bottom $d$, the other part of the blow-mold having a groove adapted to receive the projecting portion of the bottom $d$ when the two parts of the mold are closed together, as will be readily understood by those skilled in the art. From this description it will be noted that the pivotal points of the blow and the press molds are in the same vertical plane, whereby the molds are adapted to close a common point, so that when the pressed blank is released by the press-mold the blow-mold when closed will close around the suspended blank.

A plurality of neck-ring molds G are provided, and preferably a number corresponding to the number of blow-molds. These neck-rings consist of two parts hinged together, as is commonly the case in machines of this character; but in this case the neck-rings are separate and independent of the two parts which form the blow-molds proper. The neck-rings are constructed to coöperate with both the blow and the press molds.

Projecting from the table at a point inside of the pivotal point of the parts of the blow-mold are standards H, and extending outward over the blow and press molds are the ring-supports I, which in this case, as shown, consist of two parallel arms adapted to engage grooves or shoulders upon the neck-rings and to support them when the press-mold is disengaged from the pressed blank and to thereby suspend the pressed blank ready to be embraced by the blow-mold.

Situated at the charging and pressing point and upon the base A is a motor for moving the press mold or molds vertically and in position to receive the neck-ring and the charge of molten glass. As shown in Figs. 1 and 2 and as before stated, the two parts of the press-mold E are journaled to the under side of the table C. The motor here shown comprises a cylinder J, and a piston-rod K, which is adapted to be reciprocated within the cylinder by fluid-pressure, the fluid-pressure being admitted through the pipes $e$ and controlled through the medium of a valve $f$, carrying at its lower end a treadle $g$. This valve $f$ is constructed in any well-known way for admitting air or fluid pressure at opposite sides of the piston for moving it to either end of the cylinder. Links $h$ have their upper ends pivotally connected to the upper ends of the two parts E of the press-molds, and their lower ends are pivotally connected with a cross-head $i$. This cross-head $i$ is adapted to be engaged by the piston-rod K for forcing it upward, and thereby closing the press-mold when it is at the charging and pressing point.

The plunger-rod L carries a collar or sleeve M, adapted to fit around the outer side of the press-mold and to hold it closed while the plunger is down and presses the glass within the press-mold. When the plunger is withdrawn, carrying with it the retaining member or sleeve M, the two parts of the press-mold fall out into the position shown in Fig. 1 and below the table.

The two parts of the blow-mold are closed through the medium of a motor or actuating element, which in this instance consists of a cylinder N, supported by the column B', carrying a piston and rod P. Links $k$ have their outer ends pivotally connected to the two parts of the blow-mold, and the inner ends of these links are connected with a block or cross-head $l$. These blocks or cross-heads $l$ are supported and moved upon the rods $m$, which are suitably supported above the table, preferably having their outer ends in the standard H and their inner ends supported by the hub of the table C. The inner sides of these blocks or cross-heads $l$ are preferably curved on the arc of a circle, as shown, whereby they move around with the table C, the said piston P projecting toward the blow position, as shown, so that when the table is rotated to bring the blow-mold to the blow position it is in a line with the piston-rod to be forced outward to close the parts of the blow-mold, as will be readily understood. The piston is actuated by fluid-pressure controlled in any well-known manner, either automatically or by a handle or treadle.

The plunger-rod L is actuated through the medium of fluid-pressure, preferably, though other forms of motors or actuating members may be provided for this purpose. In this instance the said rod passes through a cylinder Q, which is supported by the standard or column B' and carries a piston R. Fluid-pressure is admitted to opposite ends of this cylinder through the pipes S and is controlled through the medium of a vertically-moving valve-rod T, having at its lower end a handle U. This construction is well known and need not be specifically described, whereby air is admitted to either end of the cylinder as desired by the operator.

Projecting outward from the plunger-rod L is an arm $n$, which carries the blow-head rod $p$, the lower end of the blow-head rod carrying the blow-head $q$. This blow-head $q$ is of the form shown and described in my patent dated June 15, 1897, No. 584,665, whereby air is automatically admitted to the blow-mold and need not be specifically described here. Projecting from the column B' at a point above the arm $n$ is an arm $s$, serving as a guide for the upper end of the blow-head rod $p$. From this description it will be seen that when the plunger-rod L is depressed the blow-head is likewise carried down, and the blow-head being supported at a distance equal to the distance between the molds it will be readily understood that when the plunger is carried into the press-mold the blow-head is carried down upon the blow-mold at the blow-point indicated in Fig. 2.

The operation of my invention as above described is as follows: The press-mold is charged at the charging and pressing point and the plunger then forced therein for producing a pressed blank. The plunger is then withdrawn from the mold, carrying with it the retaining member M, and releases the two parts of the press-mold, which fall to the position shown in dotted and full lines in Fig. 1. The pressed blank is held suspended by the neck-ring through the medium of the arms I and the table rotated, which carries the suspended pressed blank to the blow-point. At this point the piston P is forced outward and, through the medium of the mechanism described, closes the blow-mold around the suspended pressed blank. The succeeding press-mold has been brought to the charging and pressing position and the operation there repeated, as before described, the mold being closed through the medium of the piston-rod K and so held until the pressing operation has been performed. In this second pressing operation the blank which was carried to the blow position and around which the blow-mold was closed is blown through the medium of the blow-head, which is carried thereupon by the movements of the plunger-rod, as before described, so that an article is pressed in the press-mold and blown in the blow-mold at the same time. This operation is continuously repeated, the blow-mold then being carried to the discharging position, where it is opened by the turning-out boy and the neck-ring released and again placed on its supporting-arm I.

In Fig. 3 I show a modification in that a single press-mold $t$ is provided and supported upon a stationary support $u$, projecting from the base A. This press-mold is in lieu of the plurality of press-molds which are carried by the table, as illustrated in Figs. 1 and 2. The machine in all other respects is the same and the operation is practically the same. After the glass has been pressed the mold $t$ falls or is lowered, the same as in Figs. 1 and 2, to a point below the table, whereby the table revolves around over it, carrying the suspended pressed blank by the neck-ring the same as in Figs. 1 and 2. When the blank has been carried to the blow position, then the press-mold $t$ is elevated through the opening $d$ in the table ready to be again charged and the glass therein pressed.

While I here show and describe the press-mold composed of pivoted parts which swing vertically, it will be readily understood by those skilled in the art that the press mold or molds may be made solid and simply moved vertically for releasing the pressed blank and leaving it suspended to be embraced by the blow-mold without departing from the spirit and scope of my claims.

In Figs. 6 and 7 I show the detail construction for actuating the piston N automatically. In this instance the hub of the table C is provided with a plurality of arms 3, provided at their upper ends with the laterally-projecting cam-surfaces 4, which are carried around the column B' as the table rotates. The cylinder within the column B' is provided with the inlet and outlet pipes 6 and a spring-actuated valve 7, similar to the valve T in Fig. 4 and operating in the same manner. This valve has one end projecting through the column, as shown at 8, and adapted to be engaged and forced inward by the cam-surfaces 4 at the upper ends of the arms 3. These cams are so situated that the valve 7 is forced in, as shown in Fig. 6, and then the piston-rod P is forced outward by fluid-pressure into the position shown at the blow position in Fig. 2, which closes the blow-mold, as before described. By means of this construction the piston-rod P is automatically forced outward as the table revolves at the proper time for closing the blow-mold, and when the table is revolved a little farther in the direction indicated by arrow the cam-surface 4 passes away from the end of the valve 7, and it is forced outward through the medium of the spring 9, thus admitting air to the opposite end of the cylinder, which withdraws the piston-rod and forces the piston to the opposite end of the cylinder N, as will be readily understood.

Having thus described my invention, what I claim, and desire to secure by Letters Patent, is—

1. A machine for the manufacture of glassware comprising a vertically-movable and vertically-separable press-mold having a bottom, and a separate and independent horizontally-closing blow-mold having a bottom independent of the bottom of the press-mold, the two molds adapted to close over a common point, substantially as described.

2. A machine for the manufacture of glassware comprising a vertically-movable and vertically-separable press-mold, a blow-mold horizontally movable in respect to the press-mold and having a bottom independent of the bottom of the press-mold, and actuating members for the press and blow molds.

3. A machine for the manufacture of glassware comprising a vertically-opening press-mold, and a horizontally opening and closing blow-mold, substantially as described.

4. A machine for the manufacture of glassware comprising a carrier, a vertically-moving press-mold horizontally pivoted to said carrier, and a horizontally opening and closing blow-mold vertically pivoted to the same carrier, said molds adapted to close over a common point, substantially as described.

5. A machine for the manufacture of glassware comprising a carrier, a horizontally-opening press-mold horizontally pivoted to said carrier, a vertically-opening blow-mold vertically pivoted to said carrier, said molds adapted to close over a common point, actuating members adapted to operate the press and blow molds respectively for opening and closing them, and an operating mechanism for said actuating members, substantially as described.

6. A machine for the manufacture of glassware comprising a carrier, a press-mold consisting of vertically-separable parts hinged to the said carrier, a blow-mold consisting of horizontally-separable parts, the parts of the press-mold adapted to fall below the blow-mold and the parts of the blow-mold to close thereover, substantially as described.

7. A machine for the manufacture of glassware comprising a carrier, having a plurality of press-mold openings, a press-mold consisting of two or more parts pivoted to the carrier and adapted to fall through the openings, and blow-molds supported by the carrier and adapted to close over the said openings, substantially as described.

8. A machine for the manufacture of glassware comprising a support having a press-mold opening, a horizontally-opening press-mold adapted when opening to pass through the said opening, a neck-ring, a member for supporting the neck-ring over the opening, and a blow-mold carried by the support and adapted to close over the opening and around the said neck-ring, substantially as described.

9. A machine for the manufacture of glassware comprising a movable carrier, a plurality of press-molds carried thereby and consisting of several vertically-swinging portions, horizontally-closing blow-molds carried by said carrier, a member situated at the pressing-point for swinging the parts of the press-mold closed and a member situated at the blow-point for swinging horizontally the parts of the blow-mold for closing it, substantially as described.

10. A machine for the manufacture of glassware comprising a revolving table having a plurality of elongated openings, a plurality of sectional press-molds hinged to the lower side of the table and adapted to pass through the openings, a plurality of horizontally-closing blow-molds situated on the top of the table and adapted to close over the point occupied by the press-mold, a member situated at the pressing-point for closing the parts of the press-mold, and a member situated at the blowing-point for closing the parts of the blow-mold, substantially as described.

11. A machine for the manufacture of glassware comprising a support, a press-mold consisting of vertically-swinging parts, a plunger-rod carrying a press-mold-retaining member, and a blow-mold, whereby when the plunger is withdrawn the parts of the press-mold are released, substantially as described.

12. In a machine for the manufacture of glassware a movable carrier, an open-and-shut mold, a stationary cylinder, a piston and rod therein, a valve regulating the admission of fluid-pressure at opposite ends of the cylinder, and a valve-operating member carried by the said mold-carrier adapted to actuate the valve and regulate the admission of fluid-pressure to the cylinder as and for the purpose described.

13. A machine for the manufacture of glassware comprising a revolving mold-carrier, an open-and-shut mold carried thereby, a stationary cylinder, a piston and rod therefor; a valve regulating the admission of fluid-pressure to opposite ends of the cylinder, and a cam carried by the said mold-carrier traveling in the path of the said valve and adapted to actuate the same, substantially as described.

14. A machine for the manufacture of glassware comprising a revolving mold-carrier, a plurality of molds carried thereby, a stationary cylinder, a piston and rod carried thereby, a valve regulating the admission of fluid-pressure to opposite ends of the cylinder, and a plurality of valve-actuating members, one for each of the molds, the said valve-actuating members adapted to operate the valve as and for the purpose described.

15. A machine for the manufacture of glassware comprising a mold-carrier, a plurality of molds, a plunger situated at the pressing-point, a stationary cylinder situated at the blowing-point, a piston and rod carried by the said cylinder, a plurality of open-and-shut molds carried by the mold-carrier, the piston and rod adapted to close the said molds, a valve regulating the admission of fluid-pressure to opposite ends of the cylinder, and valve-actuating members carried by the mold-carrier, the parts adapted to operate as and for the purpose described.

In testimony whereof I have hereunto set my hand in the presence of two subscribing witnesses.

CHARLES EDWIN BLUE.

Witnesses:
W. B. JONES,
H. W. BENNETT.